United States Patent
Hanamoto et al.

(10) Patent No.: US 6,489,740 B2
(45) Date of Patent: Dec. 3, 2002

(54) SPINDLE MOTOR CONTROL METHOD OF OPTICAL DISK RECORDING AND REPRODUCING APPARATUS

(75) Inventors: Yasushi Hanamoto, Hanyu (JP); Toru Tanaka, Ota (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/854,066

(22) Filed: May 10, 2001

(65) Prior Publication Data

US 2001/0046378 A1 Nov. 29, 2001

(30) Foreign Application Priority Data

May 24, 2000 (JP) ........................................ 2000-153435
May 25, 2000 (JP) ........................................ 2000-154869

(51) Int. Cl.[7] .............................................. G05B 11/01
(52) U.S. Cl. ..................... 318/560; 318/606; 318/608; 369/47.1; 369/47.25; 369/47.27
(58) Field of Search ........................ 388/805; 318/560, 318/606, 608; 369/47.1, 47.48, 47.28, 47.25, 47.27

(56) References Cited

U.S. PATENT DOCUMENTS 5,434,829 A * 7/1995 Maeda et al. ................. 369/48
5,703,853 A * 12/1997 Horigome et al. ............. 369/48
6,137,756 A * 10/2000 Yoshida et al. ................ 369/47
6,172,956 B1 * 1/2001 Fuji .............................. 369/58
6,192,015 B1 * 2/2001 Kim .............................. 369/48
6,385,151 B2 * 5/2002 Kuroda et al. ............ 369/47.28

* cited by examiner

Primary Examiner—Robert E. Nappi
Assistant Examiner—Rina I. Duda
(74) Attorney, Agent, or Firm—Hogan & Hartson, LLP

(57) ABSTRACT

To provide a spindle motor control method adapted to an optical disk recording and reproducing apparatus capable of recording a signal onto a disk using a laser applied from an optical pick-up, a reference signal originated from a disk (1) and a reference signal necessary for signal recording are synchronized to each other when resuming signal recording once suspended. The synchronization is established without using a phase error component. Once synchronization is established, a phase error component is added to a servo signal of the spindle motor (2). A gain for a phase error component is begun gradually increasing after a phase error component is begun being added to a servo signal. An upper limit value of the gain of a phase error component to be added is determined depending on the location of a part on the disk (1) at which to resume the once suspended signal recording.

14 Claims, 3 Drawing Sheets

SPINDLE MOTOR CONTROL METHOD OF OPTICAL DISK RECORDING AND REPRODUCING APPARATUS

BACKGROUND OF THE INVENTION

1. Field of the Invention

The present invention relates to an optical disk recording and reproducing apparatus recording a signal onto a disk using a laser from an optical pick-up, and reproducing a signal recorded on the disk using a laser.

2. Description of the Related Art

Disk players which read a signal from a disk using an optical pick-up are popular. In particular, optical disk recording and reproducing apparatuses capable of signal recording using a laser from an optical pick-up, as well as signal reproducing, have recently been introduced to the consumer market. Optical disk recording and reproducing apparatuses capable of signal recording onto a disk while controlling the disk to rotate at a high linear velocity, such as twice, four, six, eight, ten, and twelve times as fast as a standard linear velocity, are also being developed.

An optical disk recording and reproducing apparatus records signal onto a disk in response to a record command from a host device or a computer device. During this recording, a signal to be recorded onto a disk, or a recording signal, is temporarily stored in a buffer RAM and read therefrom to be recorded, so that the signal is recorded onto the disk.

In normal signal recording operation, writing of signals from the computer device into a buffer RAM, reading of signals from the buffer RAM, and recording of signals onto the disk are all carried out in accordance with the amount of signals to be recorded and signal recording condition. However, even though the signal recording onto the disk is carried out at a higher linear velocity during such normal signal recording operation, signal writing into the buffer RAM may not be carried out at a sufficiently high speed commensurate with that signal recording onto the disk. This may cause shortage of recording signals, and an interruption of signal recording onto the disk. This phenomena, generally referred to as buffer under-run, may be considered an error and may result in a critical error disabling signal reproduction from the disk.

In order to address these problems, techniques are suggested including one in which signal recording onto the disk is suspended upon occurrence of buffer under-run phenomena, and thereafter resumed when signals of a predetermined or more amount have been stored in the buffer RAM.

According to this technique, when the recording of suspended signal is resumed, a signal recorded onto the disk before the suspension is read from the disk, and another signal is recorded onto the disk so as to continue from that signal. For accurate resuming of once suspended signal recording, a reference signal derived from the disk and that for use in signal recording must be accurately synchronized to each other. This method is referred to as synchronization. A synchronization process is applied so as to synchronize a reference signal originated from the disk and that for use in recording a signal read from the buffer RAM. This process is achieved through forced control of the timing of the phase of the respective reference signals.

After the reference signals are synchronized to each other, a phase error component is added to a servo signal for control of the rotation of the spindle motor. Specifically, referring to FIG. 1, a gain is increased to a predetermined value at time T, or some time after the synchronization establishment, whereby a phase error component is added to a servo signal. The addition of a phase error component, however, may cause a problem including abrupt acceleration or deceleration of the spindle motor during a period before the spindle motor gets to normal servo operation. This hinders accurate resumption of once suspended signal recording.

In an optical disk recording and reproducing apparatus in which the disk is controlled to rotate at a constant linear velocity for signal recording, the disk actually rotates faster when a signal is to be recorded onto a part on the disk closer to the disk center rather than a part farther from the disk center. Conventionally, however, despite this difference in the disk rotation speed, a gain for addition of a phase error component to a servo signal is maintained constant wherever part on the disk a signal is to be recorded. This makes it impossible to achieve optimum speed control.

SUMMARY OF THE INVENTION

The present invention has been conceived to overcome the above problems and aims to provide a spindle motor control method adapted to an optical disk recording and reproducing apparatus which can solve the above problems.

According to the present invention, there is provided a spindle motor control method adapted to an optical disk recording and reproducing apparatus which reads a signal having been recorded onto a disk before the recording was suspended, and records another signal so as to continue from that signal read. In this spindle motor control method, a reference signal reproduced from the disk and that for use in signal recording are made synchronized to each other without utilizing a phase error component when resuming signal recording. Once synchronization is established, a phase error component is added to a servo signal of the spindle motor. With this arrangement, the rotation of the spindle motor can be accurately controlled when resuming the signal recording.

For addition of a phase error component, the gain of a phase error component is gradually increased while a phase error component is added to a servo signal. In this way, sharp acceleration or deceleration of the spindle motor can be prevented, so that continuity of signals being recorded onto the disk between before and after the resuming of the signal recording can be improved.

In particular, continuous increase of the gain enables gradual addition of a phase error component to a servo signal. This in turn enables controlling the spindle motor to rotate smoothly. Alternatively, stepwise increase of the gain can facilitate digital control of the gain.

The final level for a phase error component to reach as a result of gradual increase of its gain can be determined according to the location of a part on the disk at which to resume signal recording, making it is possible to control the rotation of the spindle motor irrespective of the location of a part on the disk at which to resume signal recording, specifically, whether the part is close to or far from the disk center.

The final level for a phase error component to reach as a result of gradual increase of its gain can also be determined according to the disk rotation speed, making it is possible to control the rotation of the spindle motor regardless of a recording speed even when an optical disk recording and reproducing apparatus capable of multiple speed recording is employed.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENT

Figure 1:
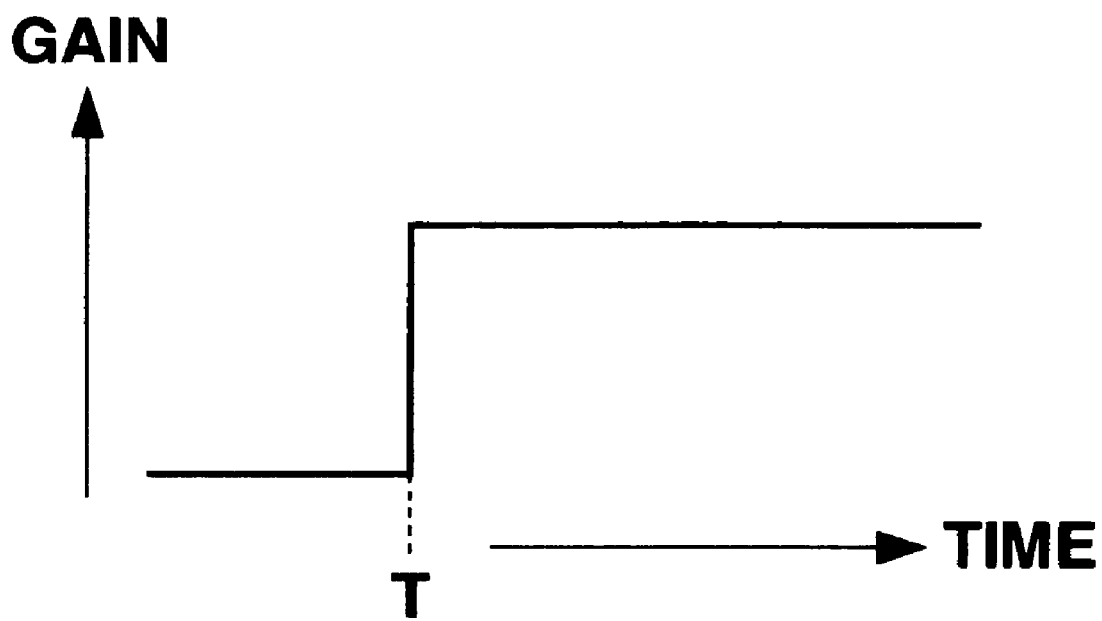
FIG. 1 is a diagram explaining a conventional spindle motor control method.
Figure 2:
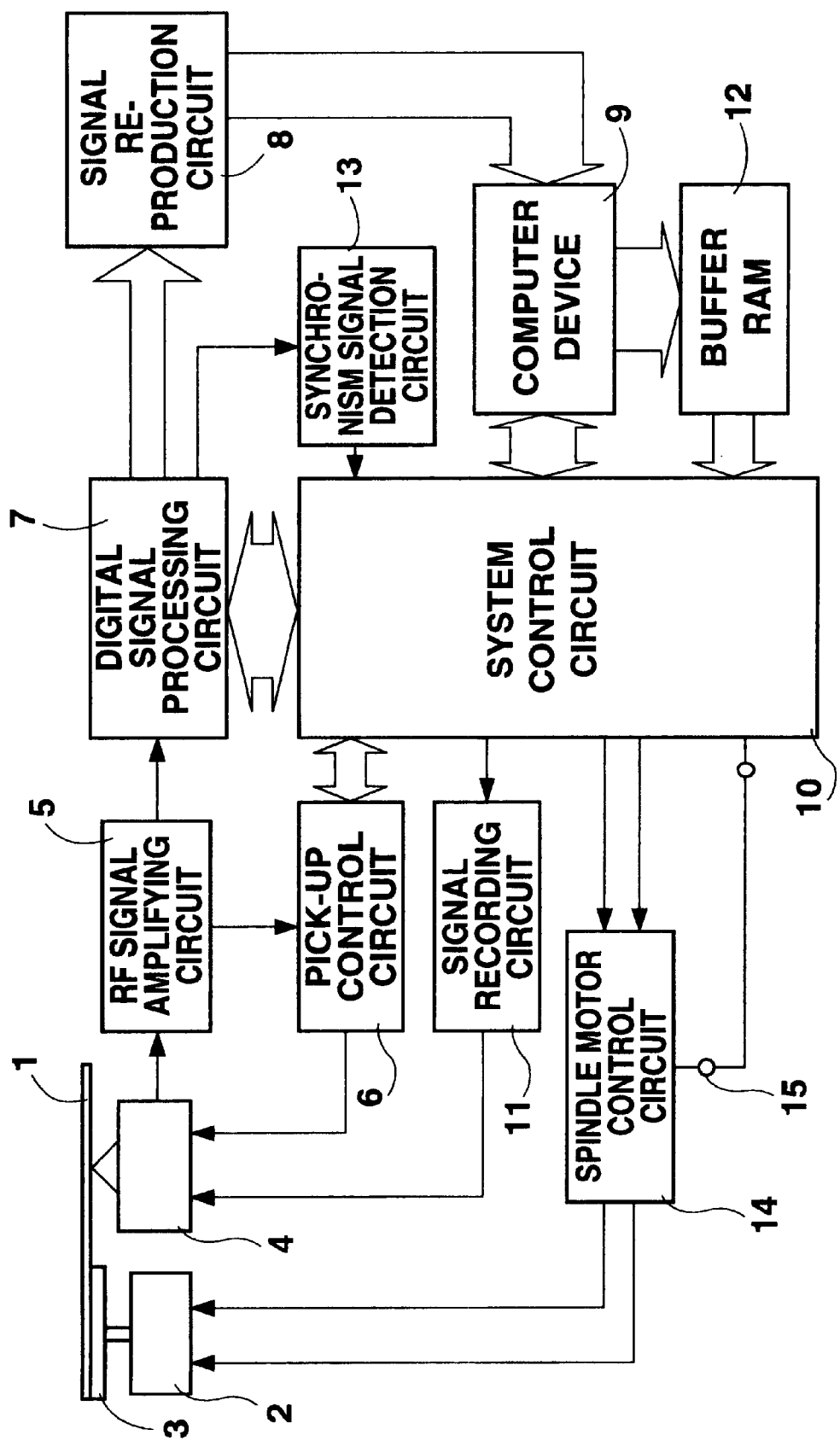
FIG. 2 is a block diagram showing an example of an optical disk recording and reproducing apparatus of a preferred embodiment according to the present invention.
Figure 3:
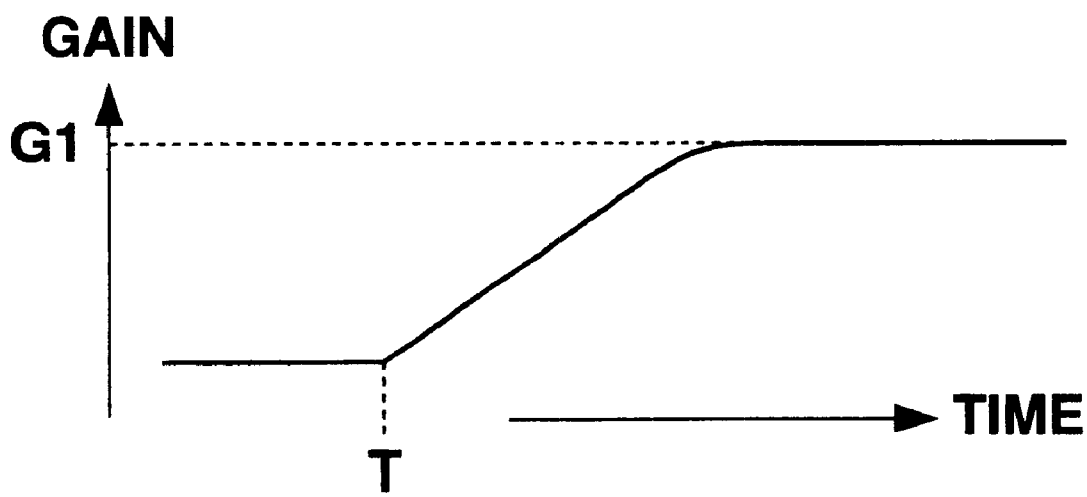
FIG. 3 is a diagram explaining the present invention.

FIG. 2 is a block diagram showing a circuit of an optical disk recording and reproducing apparatus in a preferred embodiment of the present invention. FIGS. 3 an 4 are diagrams explaining the present invention.

Referring to FIG. 2, a disk 1 is placed on a turntable 3 which is driven to rotate by a spindle motor 2, to be driven to rotate by the turntable 3. Positional information data is recorded in a wobble in a groove on the disk 1, so that signal recording and reproducing operation is carried out based on a wobble signal obtained from the groove. An optical pick-up 4 includes a laser diode for irradiating an optical beam to the disk 1, and a monitor diode for monitoring the optical beam output from the laser diode. The pick-up 4 further includes an optical detector for receiving an optical beam reflected on the signal surface of the disk 1. The main body of the pick-up 4 is advanced in the radial direction of the disk 1 by a pick-up advancement motor, not shown.

An RF signal amplifying circuit 5 amplifies and adjusts the waveform of an RF signal from the optical detector incorporated into the pick-up 4. A pick-up control circuit 6 conducts focusing control and tracking control. In actuality, a focus servo circuit and a tracking servo circuit incorporated into the pick-up control circuit 6 conduct focusing control and tracking control, respectively, based on a signal from the RF signal amplifying circuit 5. An optical beam irradiated by the pick-up 4 is made focused on the signal surface of the disk 1 though focusing control, then tracking over the signal surface through tracking control.

A digital signal processing circuit 7 digitally processes a signal from the RF signal amplifying circuit 5, and modulates a variety of signals. A signal reproduction circuit 8, after receiving a digital signal from the digital signal processing circuit 7, converts the digital signal into an analog signal before outputting the signal to an amplifier and so on when information in the form of an audio signal is recorded onto the disk 1, and outputs a digital signal intact to a host device or a computer device 9 when information in the form of a data signal, such as a computer software, is to be recorded onto the disk 1.

A system control circuit 10 receives a demodulated signal from the digital signal processing circuit 7, and performs various control operations in response to a command signal from the computer device 9. A signal recording circuit 11 receives a recording signal, such as a test signal, an information signal, and soon, and controls laser irradiation by a laser driving circuit, not shown, in accordance with the received signal, to record a data signal and so on onto the disk 1.

A buffer RAM 12 temporarily stores a recording signal. Specifically, a signal from the computer device 9 is written into the buffer RAM 12. Signal storing and reading with respect to the buffer RAM 12 is controlled by the system control circuit 10. The synchronism signal detection circuit 13 detects a synchronous signal, or a reference signal, recorded on the disk 1, in particular, in a wobble signal read by the pick-up 4. A spindle motor control circuit 14 controls rotation of the spindle motor 2 in response to a control signal output from the system control circuit 10 based on a signal from the synchronism signal detection circuit 13. Specifically, the spindle motor control circuit 14 supplies an acceleration or deceleration signal to the spindle motor 2 in response to a control signal from the system control circuit 10, whereby the disk 1 is controlled to rotate at a constant linear velocity.

In normal operation, the spindle motor control circuit 14 controls rotation of the spindle motor 2 through addition of a phase error component concerning a difference between a reference signal reproduced from the disk 1 and that for use in signal recording, to a servo signal of the servo circuit incorporated into the spindle motor control circuit 14. When recording of a suspended signal is resumed, on the other hand, a phase error component is not added to a servo signal until the above described synchronization is established. Once synchronization is established, a phase error component is started to be added to a servo signal by gradually increasing a gain. The gradual increase of a gain is controlled through application of a control signal from the system control circuit 10 to the control terminal 15 provided to the spindle motor control circuit 14.

A gain for addition of a phase error component to a servo signal is set larger in a case where a signal is to be recorded into a section on the disk 1 closer to the disk center rather than a section farther from the disk center because the disk 1 is required to rotate faster than the latter.

With the above arrangement, signals from the computer device 9 are first stored in the buffer RAM 12 and read therefrom for the recording during signal recording onto the disk 1. Therefore, the signal recording onto the disk 1 can be controlled through control of the signal reading from the buffer RAM 12. In order to resume suspended signal recording onto the disk 1, a signal stored in the buffer RAM 12 is read and compared with the signal last recorded onto the disk 1 before recording discontinuation or suspension, and the signal read from the buffer RAM 12 is recorded onto the disk 1 so as to continue from the signal read from the disk 1. As described above, a signal is recorded continuing from the signal having been recorded onto the disk before the signal recording suspension, i.e., in a "seamless" method.

Next described is a signal reproduction operation performed by an optical disk recording and reproducing apparatus of the present invention, which has the above described structure.

In response to a reproduction command signal supplied from the computer device 9 to the system control circuit 10, the system control circuit 10 constituting a part of a drive device, the system control circuit 10 starts controlling signal reproduction. In signal reproduction, a laser drive circuit supplies a driving current to a laser diode incorporated into the pick-up 4, for producing a laser output for signal reading operation.

Upon start of the control for signal reproduction, the spindle motor control circuit 14 also begins controlling the spindle motor 2 such that the disk 1 rotates at a constant linear velocity. This is achieved through comparison between a reference signal obtained by decoding a wobble signal and that which is output from the reference signal generation circuit, not shown. Specifically, a phase error component concerning a difference between these reference signals is added to a servo signal for feedback control so as to eliminate the phase error component. This control for driving the disk 1 to rotate at a constant linear velocity is applied also in signal recording operation, as will be described later.

Rotation of the spindle motor 2 is controlled as described above in signal reproduction.

Here, focusing control and tracking control are performed in signal reproduction, whereby the pick-up 4 begins signal reading from the disk 1. In actuality, prior to the signal reading from the disk 1, TOC data is read from a read-in area, the area constituting an initial session of the disk 1, and a signal is read for reproduction from the initial session of the signal recording area on the disk 1, based on the TOC data read.

The signal read by the pick-up 4 is sent to the RF signal amplifying circuit 5 for amplification and waveform adjustment, and further to the digital signal processing circuit 7 for demodulation. In demodulation, information data is extracted from the signal, and subjected to signal processing such as error correction and so on. The resultant data is sent to the signal reproduction circuit 8.

When the information data read from the disk 1 is in the form of an audio signal, the signal reproduction circuit 8 converts the information data into an analog signal before outputting to an amplifier or the like. On the other hand, when the information data is in the form of a data signal, such as a computer software, the signal reproduction circuit 8 forwards the information data intact to the computer device 9.

While signal reproduction is performed as described above in the present invention, signal recording onto the disk 1 is performed as described below.

Initially, a test signal is recorded onto a test area on the disk 1, and then read therefrom for reproduction. This process makes it possible to supply a driving current enough to produce optimum laser output for the recording, to the laser diode. After this initial setting, information data stored in a "buffer" area on the disk 1 is read. This data indicates information such as, for example, a location of a signal recorded in the signal recording area.

Based on the information data read, it is determined if recording of a data signal onto a signal recording area on the disk 1 is possible, and, if possible, at which position signal recording should be started, and such characteristics.

After this determination is completed, the pick-up 4 is advanced to the section of the disk 1 at which signal recording onto the disk 1 is to begin. In addition, writing of signals into the buffer RAM 12 begins. When a predetermined or more amount of signals have-been stored in the buffer RAM 12, signals are begun being read from the buffer RAM 12 to be supplied to the signal recording circuit 11. Thereupon, the signal recording circuit 11 starts controlling a laser driving circuit so that signals are recorded onto the disk 1.

During the above described signal recording operation according to the present invention, basically, signal writing into the buffer RAM 12 is performed in accordance with signal reading from the buffer RAM 12. That is, a signal may be stored in a part in the buffer RAM 12, from which a signal has been read. This process is repeatedly performed.

When signal recording onto the disk 1 is discontinued or suspended, signal reading from the buffer RAM 12 is also discontinued or suspended, followed by disconnection or suspension of signal writing into the buffer RAM 12.

In order to resume the suspended signal recording onto the disk 1, the pick-up 4 is brought to a position on the disk 1 taken aback from the part at which to resume signal recording, or at which signal recording was discontinued or suspended, and a signal is read from that part for reproduction. Simultaneously, reception of recording signals is also started.

The thus reproduced signal, which is the signal last recorded onto the disk 1 before the discontinuation or suspension of the data recording, is then compared with a signal stored in the buffer RAM 12. When these signals are the same, a signal stored in the buffer RAM 12 so as to continue from the signal subjected to the comparison is read, and sent to the signal recording circuit 11. Thereupon, signal recording onto the disk 1 is resumed.

Signal recording onto the disk 1 is suspended and resumed as is described above. That is, signals can be continuously, or "seamlessly", recorded onto the disk despite the suspension.

During signal recording onto the disk 1 of the present invention, which is performed basically described above, signal writing into the buffer RAM 12 may lag behind the signal recording. This will be described later.

In such a situation, as signal recording onto the disk 1 proceeds, the signals stored in the buffer RAM 12 gradually runs short. When the length of the signal in the buffer RAM 12 falls below a predetermined amount, shortfall of recording signals may result. Accordingly, signal recording onto the disk 1 is suspended and, moreover, general signal writing into the buffer RAM 12 is also suspended. This is referred to as buffer under-run phenomena. This phenomena may occur more likely to an optical disk recording and reproducing apparatus capable of higher speed signal recording onto the disk 1.

In such a phenomena, a process to resume signal recording onto the disk 1 is applied in an optical disk recording and reproducing apparatus. This process is actually implemented when signals of a predetermined length have been stored in the buffer RAM 12 after the writing of a suspended signal into the buffer RAM 12 is resumed.

When the optical disk recording and reproducing apparatus retrieves the state, as a result of the above process, which allows signal recording onto the disk, the apparatus is ready also to write and read signals with respect to the buffer RAM 12. Then, the optical disk recording and reproducing apparatus resumes actual signal recording onto the disk 1.

Resumption of once suspended signal recording onto the disk 1 is performed in a "seamless" manner, as described above. This is realized through reproduction of a signal recorded onto the disk 1 before the signal recording suspension, and comparison between that signal with a signal stored in the buffer RAM 12.

Signal reproduction and recording, and resuming of suspended signal recording in the present invention are carried out as described above. Next described is a spindle motor control method, or the substantial matter of the present invention.

As described above, in order to resume signal recording once suspended, a signal recorded onto the disk 1 before the signal recording suspension is reproduced and compared with a signal stored in the buffer RAM 12. When the comparison shows that the signals are the same, a signal is recorded onto the disk 1 so as to continue from that recorded signal. During this process to resume once suspended signal recording, addition of a phase error component to a servo motor for use in control of the rotation speed of the spindle motor 2 is refrained until the above-described synchronization is established. That is, rotation of the spindle motor 2 is controlled without adding a phase error component to a servo signal. Instead, rotation of the spindle motor 2 is controlled using a reference signal reproduced from the disk 1. While rotation of the spindle motor 2 is being thus controlled, synchronization process is performed to synchronize the phase of a reference signal necessary for signal recording to that of the reference signal reproduced from the disk 1.

Establishment of the synchronization triggers the process of adding a phase error component to a servo signal, the component concerning a difference between a reference signal and a reference signal reproduced from the disk 1. The addition is thereafter continued while gain is gradually increased. Gradual increase of the gain is achieved through application of a control signal from the system control circuit 10 to the control terminal 15 of the spindle motor control circuit 14.

Figure 4:
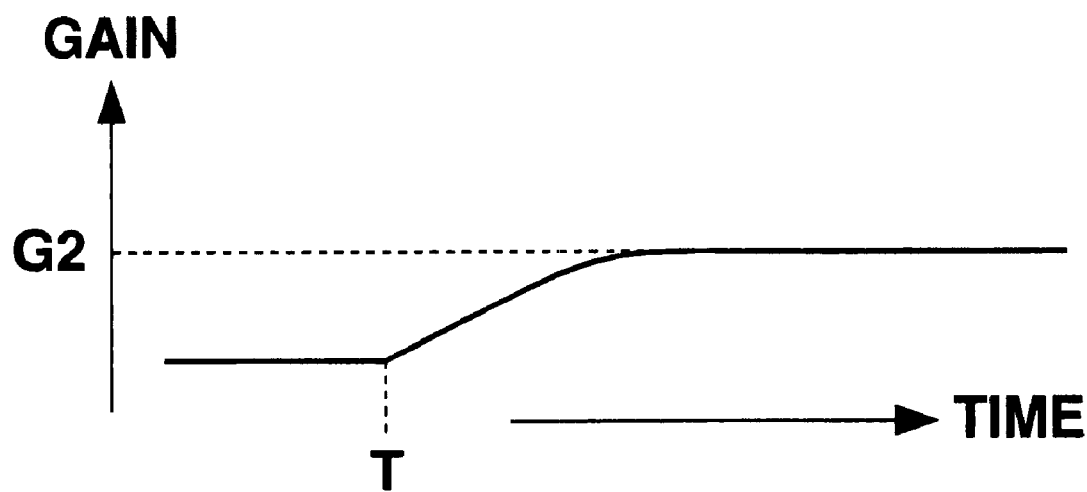
FIG. 4 is a diagram explaining the present invention.

FIGS. 3 and 4 are diagrams explaining this process. In the drawings, T represents a time point at which the above described synchronization is established. At time T, addition of a phase error signal to a servo signal begins. As shown, the gain of a phase error component is controlled so as to gradually increase.

FIG. 3 relates to a case where signal recording onto the disk begins with a part closer to the center of the disk. In such a case, the gain is controlled to gradually increase to the upper limit value G1. Meanwhile, FIG. 4 relates to a case where signal recording onto the disk 1 begins with a part farther from the center, as compared with the case shown in FIG. 3. In such a case, the gain is controlled to increase gradually to the upper limit value G2. In the above, the upper limit values G1, G2 are related to each other as G1>G2.

A gain G1 for a recording start point closer to the center of the disk 1 is set larger than a gain G2 for that farther from the center, as described above, because the disk 1 is required to rotate faster in the former and, therefore, a larger gain is necessary for servo operation, compared with the latter case.

Addition of a phase error component to a servo signal while gradually increasing a gain can prevent abrupt addition of a phase error component to a servo signal. As this in turn can prevent sharp change in the rotation speed of the spindle motor 2, the disk 1 can be controlled to rotate smoothly when signal recording of a once suspended signal is resumed. Therefore, in an attempt of resuming signal recording once suspended, signal can be recorded onto the disk so as to accurately continue from the signal last recorded onto the disk 1 before the suspension.

As described above, by supplying a control signal from the system control circuit 10 to the control terminal 15 of the spindle motor control circuit 14, a gain of a phase error component to be applied to a servo signal is controlled to increase. In such control, when a gain is controlled to vary continuously, as shown in FIGS. 3 and 4, a phase error component to a servo signal can be gradually added, so that the spindle motor 2 can rotate smoothly. Alternatively, when a gain is controlled to vary stepwisely, the gain can be easily digitally controlled.

The upper limit values, such as values G1, G2 in the drawing, can be determined so as to vary either continuously or stepwisely according to a part on the disk 1 at which to resume signal recording, while the parts shifts from closer to the center of the disk 1 to farther therefrom. Alternatively, the upper limit value can be determined corresponding to the rotation speed, or a recording speed, of the disk 1.

What is claimed is:

1. A spindle motor control method, adapted to an optical disk recording and reproducing apparatus which reads a signal having been recorded onto a disk before suspension of signal recording onto the disk, and records another signal onto the disk so as to continue from the signal read, the spindle motor control method, comprising the steps of:

synchronizing a reference signal reproduced from the disk and a reference signal for use in the signal recording when resuming the signal recording once suspended; and upon establishment of synchronization, adding a phase error component obtained on the basis of both of said reference signals to a servo signal of a spindle motor.

2. A spindle motor control method according to claim 1, wherein the phase error component is added to the servo signal while gradually increasing a gain of the phase error component.

3. A spindle motor control method according to claim 2, wherein the gain is increased continuously.

4. A spindle motor control method according to claim 2, wherein the gain is increased stepwisely.

5. A spindle motor control method, adapted to an optical disk recording and reproducing apparatus which reads a signal having been recorded onto a disk before suspension of signal recording onto the disk, and records another signal onto the disk so as to continue from the signal read, the spindle motor control method, comprising the steps of:

synchronizing a reference signal reproduced from the disk and a reference signal for use in the signal recording when resuming the signal recording once suspended; and upon establishment of synchronization, adding a phase error component obtained on the basis of both of said reference signals to a servo signal of a spindle motor while gradually increasing a gain of the phase error component, magnitude of the gain of the phase error component being determined according to a location on the disk at which a signal is to be recorded.

6. A spindle motor control method according to claim 5, wherein the gain is increased gradually.

7. A spindle motor control method according to claim 5, wherein the gain is increased stepwisely.

8. A spindle motor control method according to claim 5, wherein magnitude of the gain is determined according to a rotation speed of the disk.

9. A spindle motor control method according to claim 5, wherein the gain increases to an upper limit gain during the process of adding the phase error component to the servo signal, and the upper limit gain is determined depending on a location, in a radial direction of the disk, at which a signal is to be recorded.

10. A spindle motor control method according to claim 9, wherein the upper limit gain is determined larger when the part at which to record a signal is located closer in the radial direction of the disk to the center of the disk.

11. A spindle motor control method according to claim 5, wherein the gain increases to an upper limit gain during process of adding the phase error component to the servo signal, and the upper limit gain is determined depending on a rotation speed of the disk.

12. A spindle motor control method according to claim 11, wherein the upper limit gain is determined larger when the rotation speed of the disk is higher.

13. A spindle motor control method according to claim 5, wherein the gain increases to an upper limit gain during process of adding the phase error component to the servo signal, and a speed at which to increase the gain is determined depending on the upper limit gain.

14. A spindle motor control according to claim 13, wherein the speed at which to increase the gain is determined higher when the upper limit gain is higher.

* * * * *